Aug. 23, 1955   J. G. GUTSHALL   2,715,788
MAP HOLDER AND DISPLAY BOARD FOR MAPS INCLUDED IN A SHEAF
Filed Jan. 21, 1955   3 Sheets-Sheet 1

INVENTOR.
James G Gutshall
BY Scott L. Norviel
atty.

INVENTOR.
James G. Gutshall
BY Scott L. Norvell
Atty

Aug. 23, 1955  J. G. GUTSHALL  2,715,788
MAP HOLDER AND DISPLAY BOARD FOR MAPS INCLUDED IN A SHEAF
Filed Jan. 21, 1955  3 Sheets-Sheet 3

INVENTOR.
James G. Gutshall
BY Scott L. Norviel
atty

United States Patent Office 2,715,788
Patented Aug. 23, 1955

2,715,788

MAP HOLDER AND DISPLAY BOARD FOR MAPS INCLUDED IN A SHEAF

James G. Gutshall, Phoenix, Ariz.

Application January 21, 1955, Serial No. 483,298

3 Claims. (Cl. 40—83)

This invention concerns a map holder and display board for selectively displaying maps or plans included in a sheaf.

One of the objects of the invention is to provide a holder for a sheaf of maps or plans attached to a display board and arranged so that anyone of the maps may be rolled out onto the display board for viewing, and may be held in place thereon in a convenient manner, while other maps in the sheaf will automatically roll out of the way and slide beneath the map or plan being viewed; after use the map viewed, as well as all other maps, will easily and automatically be rolled back onto the roller.

Another object of the device is to provide a roll type holder for sheaves of bound maps or plans arranged so that the entire sheaf may be easily attached to or removed from the roller, as desired.

Another object is to provide a device, as above described, wherein the entire roller may be easily removed from the holder attached to the viewing board and another roller, on which a different set of maps or plans is attached, may be quickly and easily substituted.

Still another object is to provide, in a device as above described, a means for claspably securing the map which is selected for viewing to the outer end of the board so that it will lie flat and will not be subjected to movement due to wind or handling.

Other objects will appear hereinafter.

I attain the foregoing objects by means of the device, parts, and combinations of parts shown in the accompanying drawings in which—

Similar numerals refer to similar parts in the several views.

Figure 1:
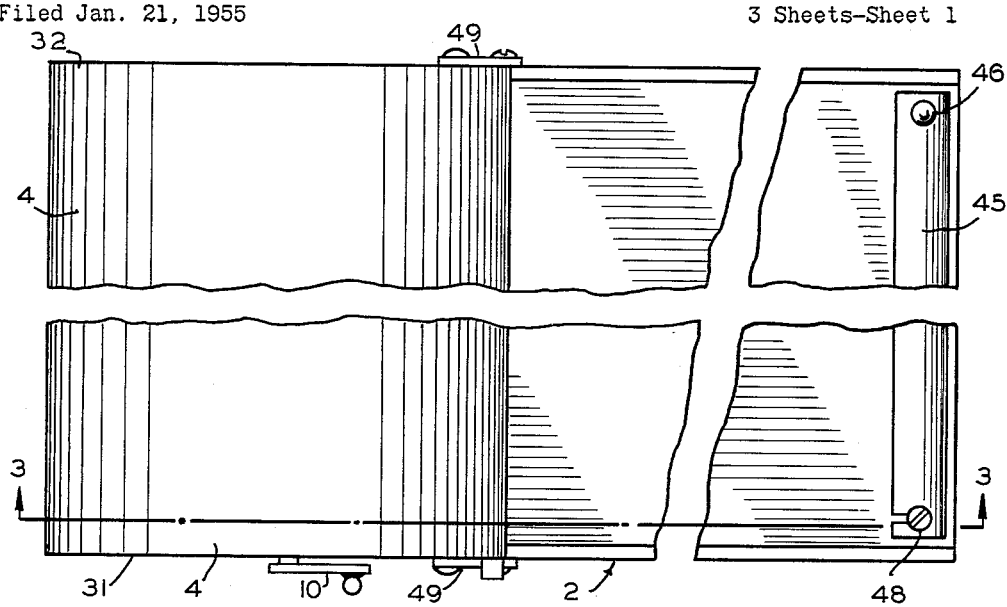
Figure 1 is a plan view of the device.

The entire device includes a viewing board 2 and a map holding roller 3 which is covered by a hinged case 4 disposed at one end of the viewing board. Sheaves of maps 5 are secured to roller 3 by a strap 6 pivotally secured to the surface roller 3 at one end and removably secured by a notch to a screw head at the other end. This strap extends longitudinally on the surface of the roller.

The roller is supported on an axial shaft 7 which is journalled at its ends in supports 9 and 9a attached to an end portion of the board structure 2. At one end of this shaft there is a crank 10 for winding maps of the sheaf around the roller.

It is to be understood that a plurality of maps 5a and 5b are bound so that their inner edges 11 are aligned and that these inner edges are enclosed by a fold 12 of a map cover 13. All of the above end parts of the maps and the fold of the cover are stapled together to form the sheaf 5 above mentioned.

In the art to which this invention pertains, sheaves of maps of this type may constitute a group of house plans or the like and are well known to those familiar with contemporary building practices. It has heretofore been the practice to unroll these plans by hand and select whatever one of the plans is decided upon and then hold this plan flat by any improvised means. Since it is one of the objects of this device to provide a means for holding a selected map or plan on the board, I now describe the particular part of the mechanism that makes this possible.

Figure 2:
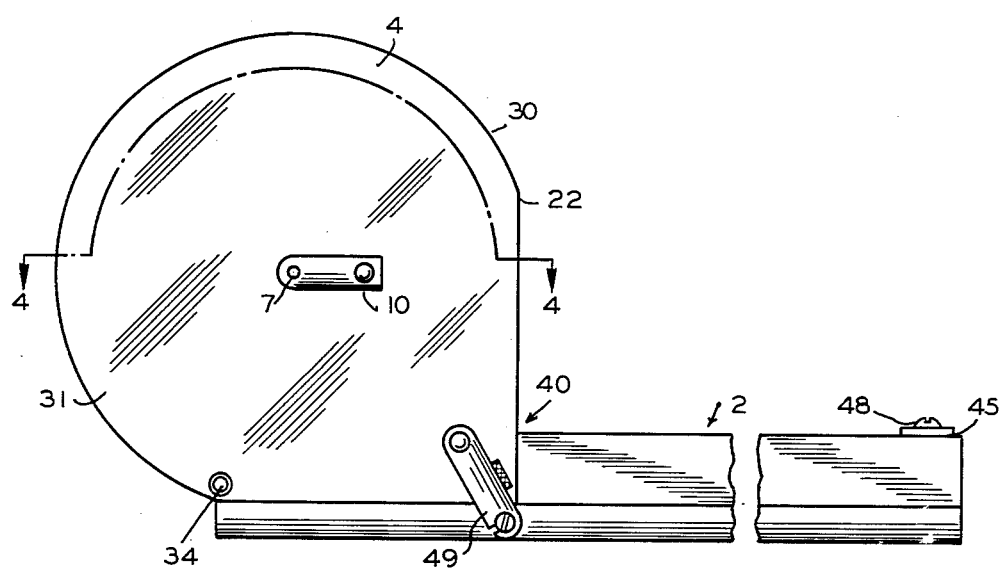
Figure 2 is a side elevational view thereof.
Figure 5:
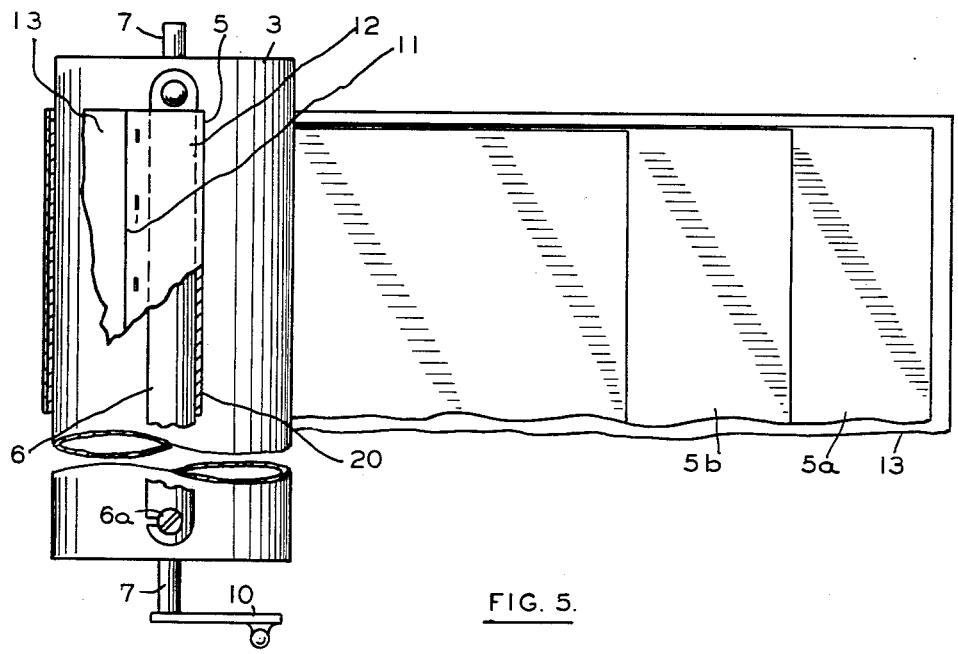
Figure 5 is a plan view of the map holding roller showing means of attachment for removably holding various sheaves of maps.

Roller 3 is enclosed by the arcuately shaped cover case 4 which has an arcuate outer surface 30 enclosed by end pieces 31 and 32. The outer lower end of this case is hinged at 34 to the extreme left end of the board, as viewed in Figure 2. This permits the cover to be closed by hinging over, to the right, and downward onto the roller 3.

Within the case there are two endless elastic belts 14 and 15 each running over groups of rollers 16, 17, 18, 19 and 20 which are disposed in aligned relation near the ends of the case. Roller 16 is positioned near the upper inner edge 22 of the case which terminates slightly below the top of the roller leaving a throat 36 through which the maps may be unrolled, while roller 17 is positioned on the viewing board so that it operates adjacent the lower edge of this throat. These rollers may be termed the terminal rollers. Rollers 18 and 19 are disposed within the case and near the back portion of roller 3. Roller 20 is attached to the upper back portion of the case cover. All rollers are disposed in aligned relation. Each of the elastic belts 14 and 15 is positioned in parallel relation to the ends of the case and each operates the same. When the case is opened as indicated by dotted lines 4a in Figure 3, the lay 37 of belts 14 or 15 which extend between rollers 16 and 17, contacts the lower portion of roller 3 only. In this position roller 3 may be removed or inserted. In doing this the far end of shaft 7 is inserted in a bearing hole in support 9a and the near end of shaft 7 dropped into a slot 38a in support 9.

Figure 3:
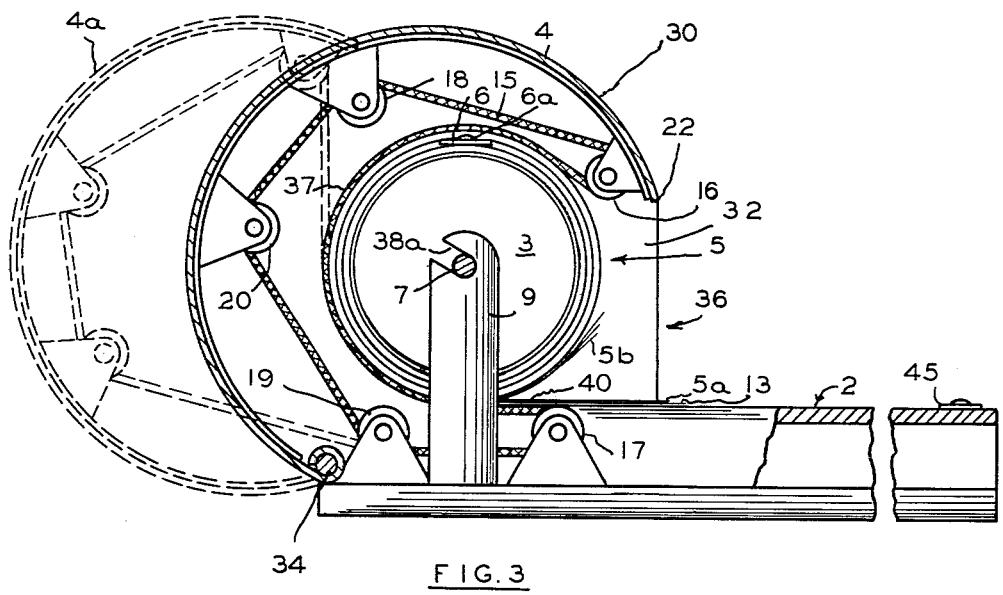
Figure 3 is a side sectional elevation taken substantially on line 3—3 of Figure 1, drawn on a somewhat enlarged scale.
Figure 4:
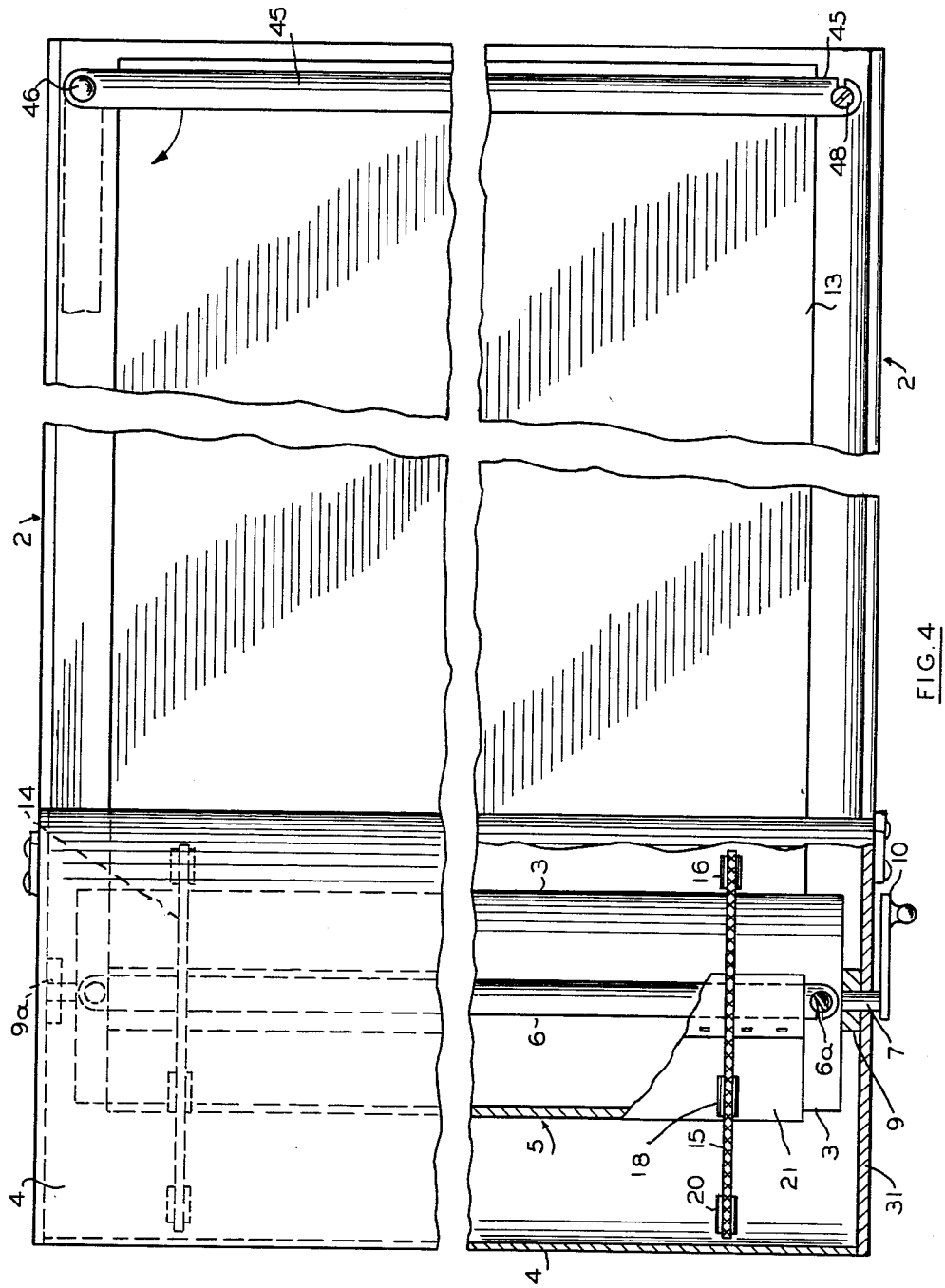
Figure 4 is a plan view of the device, drawn on a somewhat enlarged scale with parts of the case structure and board broken away to show parts beneath.

When the case is in the closed position as indicated by solid lines in Figure 3, the above mentioned lay 37 of either belt, substantially surrounds the outer surface of the sheaf of maps on the roller. There is an unsurrounded portion adjacent the throat 36 between the inner edge 22 of cover 4 and the top of board 2. When any one of the maps is pulled outward from the case so that it extends across viewing board 2, roller 3 rotates, as the sheaf unwinds. Any maps above the one pulled out are, first, rolled under lays 37 of each of the belts 14 and 15, so that they continue around roller 3, and, second, when they reach the bottom portion of the roller, as at 40, continue forward, under the map withdrawn, and slide along the face of the board 2 under the map withdrawn. This makes a convenient disposal of the maps of the sheaf which are not to be viewed. When it is desired to put away the map viewed it is merely necessary to rotate roller 3 by means of crank 10 in a clockwise direction and the map viewed, as well as those positioned beneath it will be rewound and re-rolled on roller 3.

When a map is drawn from the roller and extended across board 2 it may be held in place by a metal strap 45 which is pivoted at 46 at the far edge of the board and is held by a slot and screw head 48 at the near edge of the board.

In this way any one of the maps contained within the sheaf on roller 3 may be grasped, pulled through the opening of throat 36 and drawn over the face of board 2 for viewing. When held by strap 45 the map is unaffected by the wind and will not become dislodged by rough handling of the board.

The value of the arrangement of parts shown, is that all maps of the sheaf which are above—or rolled within— the one selected and withdrawn are rolled or curled around roller 3, extended under the bottom of roller 3 at 40, and forced outward under the map or maps withdrawn and over the face of board 2. In this position their loose ends are confined and held by the upper maps. This operation is made possible by the underlays 37 of belts 14 and 15. Maps to be withdrawn for viewing are selected by inspecting the free edges through the opening of throat 36 which extends from the inner edge 22 of case cover 4 to the top portion of board 2 just below edge 22, and slightly forward of position 40 where the maps above the one withdrawn move forward from the roller toward and over the face of board 2.

After a roller 5 with maps attached is placed on supports 9 and 9a, as above explained, and the strap 6 secured under screw head 6a, case 4 is held down on the roller 5 and the belts 14 and 15 kept under tension by clasps 49.

A different roller and different maps may thus be substituted for the roller and sheaf of maps originally shown.

Aside from convenience of viewing the board it may be provided with a handle (not shown) and used for carrying the maps. The cover 30 on case 4 is substantially weather proof and the maps on the roll are protected accordingly.

I claim:

1. A map holder and display board comprising a rectangular viewing board having an upper face, a map sheaf roller journalled at one end thereof, a sheaf of maps bound at one end in a cover attached to the face of said roller and wound around said roller, a cover for said roller hinged at the end of said board adjacent said roller and covering said roller except for a throat opening toward the opposite end of said board, and endless elastic belts operating transverse to the axis of said roller and running over rollers on the inner face of said cover to provide an outer lay contacting the surface of the maps wound on said roller from the upper edge of said throat to the surface of said board substantially below said throat; said bands engaging the free edges of any maps of said sheaf above a map drawn outward from said throat and over said viewing board and confining said edges so that the said maps above the drawn map will roll around said roller and slide under the map drawn through said throat and over the upper face of said viewing board.

2. A map holder and display board for sheaves of maps bound at one end, composed of a rectangular viewing board having an upper face for holding maps to be viewed and opposite end edges, a roller journalled on supports adjacent one end edge of said board and having its axis parallel to said board edge, means on the surface of said roller for removably attaching the bound end of said sheaf of maps, a sheaf of maps having its bound end attached to the face of said roller and rolled around said roller, a semi-cylindrical cover hinged to the end edge of said board having an outer edge hinged to the end edge of said board adjacent the end on which said roller is journalled, and having an inner edge providing a throat for withdrawal of maps from said sheaf opening toward the opposite end of said board, and means for rolling maps of said sheaf, above a map thereof drawn through said throat for viewing on said board, around said roller and forcing it outward from said throat and beneath the map drawn for viewing and over the face of said board consisting of a plurality of elastic endless belts running transversely to the axis of said roller over a plurality of aligned rollers on the under face of said cover and the upper face of said board beneath said cover, each having an outer lay extending from the upper edge of said throat, thence partially around said maps on said roller to a position below the said throat; said lay of each of said belts guiding the free ends of maps above the one drawn from said roller to be viewed around said roller and outward through said throat beneath said drawn map and the viewing face of said board.

3. A map holder and display board comprising a rectangular viewing board having an upper face, a map sheaf roller journalled at one end thereof, a sheaf of maps bound at one end in a cover attached to the face of said roller and wound around said roller, a cover for said roller hinged at the end of said board adjacent said roller and covering said roller except for a throat opening toward the opposite end of said board, and endless elastic belts operating transverse to the axis of said roller and running over rollers on the inner face of said cover to provide an outer lay contacting the surface of the maps wound on said roller from the upper edge of said throat to the surface of said board substantially below said throat; said bands engaging the free edges of any maps of said sheaf above a map drawn outward from said throat and over said viewing board and confining said edges so that the said maps above the drawn map will roll around said roller and slide under the map drawn through said throat and over the upper face of said viewing board, and a metal strip pivotally attached to said board at one end and attachable to the board at the other end, extending across the board adjacent the opposite end, holding the free ends of maps drawn from said roller and laid over the face of said board for viewing.

References Cited in the file of this patent
UNITED STATES PATENTS

| | | |
|---|---|---|
| 1,671,214 | Wilson | May 29, 1928 |
| 2,309,287 | Wilson | Jan. 26, 1943 |
| 2,552,448 | Ortendahl | May 8, 1951 |